United States Patent
Axelrod et al.

(10) Patent No.: US 10,473,923 B2
(45) Date of Patent: Nov. 12, 2019

(54) FOCAL REGION OPTICAL ELEMENTS FOR HIGH-PERFORMANCE OPTICAL SCANNERS

(71) Applicant: APPLE INC., Cupertino, CA (US)

(72) Inventors: Noel Axelrod, Jerusalem (IL); Refael Della Pergola, Jerusalem (IL)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/849,696

(22) Filed: Dec. 21, 2017

(65) Prior Publication Data

US 2019/0094531 A1     Mar. 28, 2019

Related U.S. Application Data

(60) Provisional application No. 62/563,703, filed on Sep. 27, 2017.

(51) Int. Cl.
*G02B 26/12* (2006.01)
*G06K 7/10* (2006.01)
(Continued)

(52) U.S. Cl.
CPC .......... *G02B 26/128* (2013.01); *G01S 7/4816* (2013.01); *G01S 7/4817* (2013.01);
(Continued)

(58) Field of Classification Search
CPC .. G02B 26/128; G02B 21/006; G02B 26/124; G02B 17/0684; G02B 17/0876; G02B 19/0004; G02B 19/0023; G02B 19/0052; G02B 19/0076; G02B 19/0085; G02B 19/009; G02B 19/0095; G06K 7/10564; G06K 7/10643; G01S 7/4817;
(Continued)

(56) References Cited

U.S. PATENT DOCUMENTS 5,506,394 A    4/1996   Plesko
7,588,187 B2   9/2009   Barkan et al.
(Continued)

FOREIGN PATENT DOCUMENTS

WO    2006085834 A1    8/2006

OTHER PUBLICATIONS

International Application # PCT/US2018/41179 search report dated Oct. 26, 2018.
Upton et al., U.S. Appl. No. 15/849,701, filed Dec. 21, 2017.

*Primary Examiner* — Frank G Font
(74) *Attorney, Agent, or Firm* — Kligler & Associates

(57) ABSTRACT

An optical device includes a light source, which is configured to emit a beam of light at a given wavelength, and at least one scanning mirror configured to scan the beam across a target scene. Light collection optics include a collection optic positioned to receive the light from the scene that is reflected from the at least one scanning mirror and to focus the collected light onto a focal plane, and a non-imaging optical element including a solid piece of a material that is transparent at the given wavelength, having a front surface positioned at the focal plane of the collection lens and a rear surface through which the guided light is emitted from the material in proximity to a sensor, so that the collected light is guided through the material and spread over the detection area of the sensor.

10 Claims, 2 Drawing Sheets

(51) Int. Cl.
*G02B 21/00* (2006.01)
*G01S 17/42* (2006.01)
*G01S 7/481* (2006.01)
*G02B 27/09* (2006.01)
*G02B 19/00* (2006.01)

(52) U.S. Cl.
CPC .......... *G01S 17/42* (2013.01); *G02B 19/0023* (2013.01); *G02B 19/0076* (2013.01); *G02B 21/006* (2013.01); *G02B 26/124* (2013.01); *G02B 27/0994* (2013.01); *G06K 7/10564* (2013.01); *G06K 7/10643* (2013.01)

(58) Field of Classification Search
CPC ........ G01S 7/4865; G01S 17/08; G01S 17/10; G01S 17/42
USPC ............ 359/205.1, 207.8, 212.1–214.1, 629; 385/900; 250/559.16, 559.17, 559.26, 250/559.29, 559.38, 235; 356/4.01, 5.01, 356/5.05, 5.08

See application file for complete search history.

(56) References Cited

U.S. PATENT DOCUMENTS

| | | | |
|---|---|---|---|
| 7,925,129 B2* | 4/2011 | Ghosh | F24S 23/30 385/31 |
| 9,068,917 B1 | 6/2015 | Vaez-Iravani et al. | |
| 2002/0130264 A1* | 9/2002 | Wichner | G01J 1/04 250/353 |
| 2015/0168554 A1 | 6/2015 | Aharoni et al. | |
| 2016/0146939 A1 | 5/2016 | Shpunt et al. | |
| 2016/0313445 A1* | 10/2016 | Bailey | G01S 7/481 |
| 2017/0214839 A1* | 7/2017 | Keller | H04N 5/2354 |
| 2017/0242109 A1 | 8/2017 | Dussan et al. | |
| 2017/0269215 A1 | 9/2017 | Hall et al. | |
| 2017/0352771 A1* | 12/2017 | Gu | H01L 31/0687 |
| 2018/0372847 A1* | 12/2018 | Upton | G01S 17/42 |

* cited by examiner

FOCAL REGION OPTICAL ELEMENTS FOR HIGH-PERFORMANCE OPTICAL SCANNERS

CROSS-REFERENCE TO RELATED APPLICATION

This application claims the benefit of U.S. Provisional Patent Application 62/563,703, filed Sep. 27, 2017, which is incorporated herein by reference.

FIELD OF THE INVENTION

The present invention relates generally to opto-electronic devices, and particularly to optical scanners.

BACKGROUND

Optical scanners are widely used for optically probing extended objects or target scenes. In a typical scanner a light source sends out a beam of light; the beam is scanned across the object by, for instance, a scanning mirror; then the light returned from the object is collected by collection optics and is directed to a sensor. The sensor emits a signal to a controller for further analysis.

High-performance optical scanners typically use both high-power light beams and high-speed scanners in order to sample and sense distant target scenes with high temporal and spatial resolution with a good signal-to-noise ratio.

SUMMARY

Embodiments of the present invention that are described hereinbelow provide improved optical scanners and methods for scanning.

There is therefore provided, in accordance with an embodiment of the invention, an optical device, including a light source, which is configured to emit a beam of light at a given wavelength, at least one scanning mirror configured to scan the beam across a target scene, and a sensor having a detection area. Light collection optics include a collection optic positioned to receive the light from the scene that is reflected from the at least one scanning mirror and to focus the collected light onto a focal plane. A non-imaging optical element includes a solid piece of a material that is transparent at the given wavelength, having a front surface positioned at the focal plane of the collection lens and a rear surface through which the guided light is emitted from the material in proximity to the sensor, so that the collected light is guided through the material and spread over the detection area of the sensor.

In a disclosed embodiment, the rear surface of the non-imaging optical element is in contact with the sensor, and the non-imaging optical element includes a compound parabolic concentrator (CPC). The material may include silicon or glass.

In some embodiments, the beam of light includes a beam of light pulses, and the sensor is configured to output a signal indicative of a time of incidence of a single photon on the sensor. A controller is configured to find times of flight of the light pulses to and from points in the scene responsively to the signal.

There is also provided, in accordance with an embodiment of the invention, a method of sensing, which includes scanning a beam of light at a given wavelength across a target scene using at least one scanning mirror. The light from the scene that is reflected from the at least one scanning mirror is collected and focused onto a focal plane. A front surface of a non-imaging optical element, including a solid piece of a material that is transparent at the given wavelength, is positioned at the focal plane. The collected light is sensed using a sensor positioned in proximity to a rear surface of the non-imaging optical element, which spreads the collected light over a detection area of the sensor.

The present invention will be more fully understood from the following detailed description of the embodiments thereof, taken together with the drawings in which:

DETAILED DESCRIPTION OF EMBODIMENTS

Overview

Figure 1:
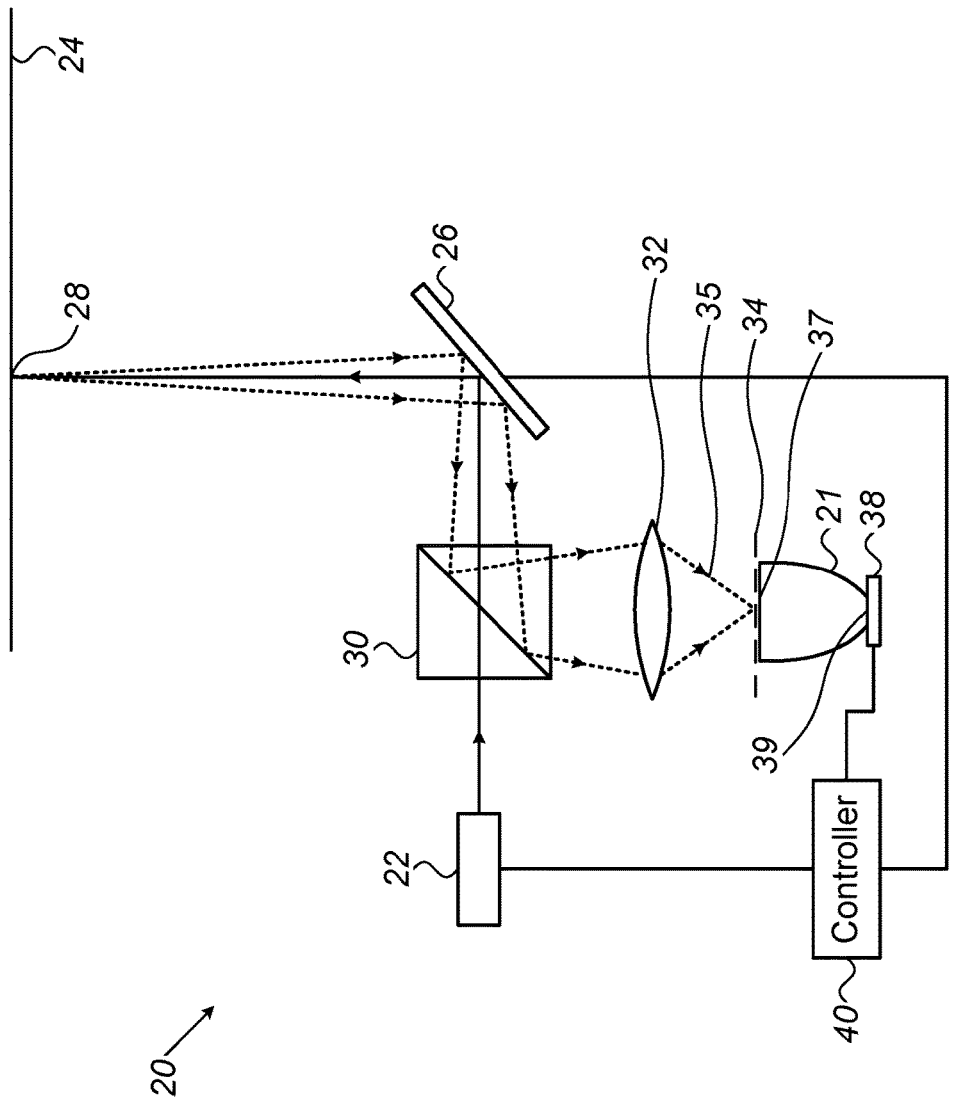
FIG. 1 is a schematic side view of an optical scanner with a non-imaging optical element, in accordance with an embodiment of the invention.

High-performance optical scanners, for instance light detection and ranging (LiDAR) sensors, typically use both high-intensity light beams and high-speed scanners in order to sample and sense distant target scenes with high spatial and temporal resolution with a good signal-to-noise ratio. The distance to the target scene may range from tens of centimeters to hundreds of meters.

The beam emitted by the light source is scanned across the target scene by a high-speed scanner, for instance by a rapidly oscillating scanning mirror. The light returned from the scene is reflected by a scanning mirror (either the scanning mirror described above or another mirror synchronized to the above mirror) towards a collection lens. An imaging collection lens focuses the returned light into a small spot on the sensor, and the signal emitted by the sensor is received by a controller for further analysis.

High-speed scanners are employed in this application to maximize the measurement rate. At very high angular speeds, the round-trip time for light can introduce a lag angle at the receiver. In order to compensate for deviations of the focused spot due to the scanner, a large sensing area is required. Furthermore, small focused spots of both returned light and scattered light have a very high irradiance that can damage the sensor and possibly degrade detection efficiency.

The lag angle $\gamma$ is given by the expression $$\gamma = 2\tau\omega_0\theta_0,$$

wherein $\omega_0$ and $\theta_0$ are the scanner frequency and amplitude, respectively, and $\tau$ is the delay time, given by $$\tau = 2R/c,$$

wherein R is the distance to the scene and c is the speed of light. The length L of the streak in the focal plane of the collection lens is given by the expression $$L = 2\gamma f = 4\tau\omega_0\theta_0 f,$$

wherein f is the focal length of the collection lens.

The embodiments of the present invention that are described herein address the above limitations so as to enable high-speed, high-resolution optical scanners utilizing a sensor with high bandwidth, low dark noise, and reduced potential for damage and saturation. The disclosed embodiments use a non-imaging optical element, which is fabricated of a solid piece of dielectric material and is positioned between the focal plane of the collection optics and the sensor. This arrangement affords at least the following advantages:

1) The beam returned from the target scene and focused by the collection optics is spread on the sensor over an area that is larger than the spot in the focal plane;
2) The beam is stabilized on the sensor to a position that is essentially independent of the mirror speed and target distance; and
3) Using a solid piece of dielectric material for the non-imaging optical element increases its acceptance angle (numerical aperture).

The use of a non-imaging optical element enables reducing the detection area of the sensor relative to what would otherwise be required in the absence of the non-imaging optics, as well as lowering the peak irradiance on the sensor. Both advantages result in larger signal bandwidth and longer detection ranges than could otherwise be achieved without the extra-focal elements.

The disclosed embodiments of the present invention provide optical scanners, wherein the light source can be either a non-laser source (such as a thermal source, a solid state source or a gas discharge source) or a laser source (either continuous-wave or pulsed). Such scanners can be used in depth-mapping systems, such as LIDARs, wherein the light source is a pulsed laser source, the sensor is a single-photon avalanche diode (SPAD), and a controller finds the distance to the target scene by time-of-flight analysis.

In alternative embodiments, other high-sensitivity sensors, such as an avalanche photodiode (APD), may be used.

System Description

FIG. 1 is a schematic side view of an optical scanner 20 with a non-imaging optical element 21, in accordance with an embodiment of the invention. The beam from a light source 22, such as, for example, a continuous-wave or pulsed laser, emitted at a given wavelength, is directed to a target scene 24 by a scanning mirror 26, forming and scanning an illumination spot 28 over the target scene. (The terms "light" and "illumination" are used herein to refer to any sort of optical radiation, including radiation in the visible, infrared, and ultraviolet ranges.) The light returned from illumination spot 28 is reflected by scanning mirror 26 and a beamsplitter 30 towards a collection lens 32, which focuses the light onto its focal plane 34 as rays 35.

Non-imaging optical element 21 has its front surface 37 positioned at or in proximity to focal plane 34 and its rear surface 39 at or in proximity to a sensor 38, such as a photodiode, a SPAD, or an APD. Non-imaging optical element 21 is fabricated of a solid piece of material that is transparent at the given wavelength and is configured to spread the light focused by collection lens 32 over the detection area of sensor 38. Front and rear surfaces 37 and 39, respectively, are coated with a suitable anti-reflection coating in order to minimize the reflection losses at these surfaces.

A controller 40 is connected to light source 22, scanning mirror 26, and sensor 38. Controller 40 typically comprises a programmable processor, which is programmed in software and/or firmware to carry out the functions that are described herein. Additionally or alternatively, at least some of the functions of controller 40 may be carried out by hardware logic circuits, which may be hard-wired or programmable. In either case, controller 40 has suitable interfaces for receiving data and transmitting instructions to other elements of the system as described. Thus, for example, controller 40 can be coupled to drive light source 22 and scanning mirror 26, as well as to receive and analyze signals emitted by sensor 38. In a LIDAR used for mapping the depth of target scene 24, for example, light source 22 comprises a pulsed laser, and sensor 38 comprises a SPAD. Controller 40 measures times of arrival of photons at sensor 38 relative to pulses emitted by light source 22 in order to derive time-of-flights across the target scene and thus to produce a depth map of the target scene.

As will be further detailed below, proper choice of non-imaging optical element 21 enables the use of a sensor 38 with a detection area having smaller dimensions than would be required if the sensor were located directly in focal plane 34. The use of a smaller detection area yields a higher bandwidth and a lower dark noise as compared to a larger sensor. Furthermore, non-imaging optical element 21 spreads the light focused at focal plane 34 over the detection area of sensor 38, thus alleviating problems that are associated with a high local irradiance.

Figure 2:
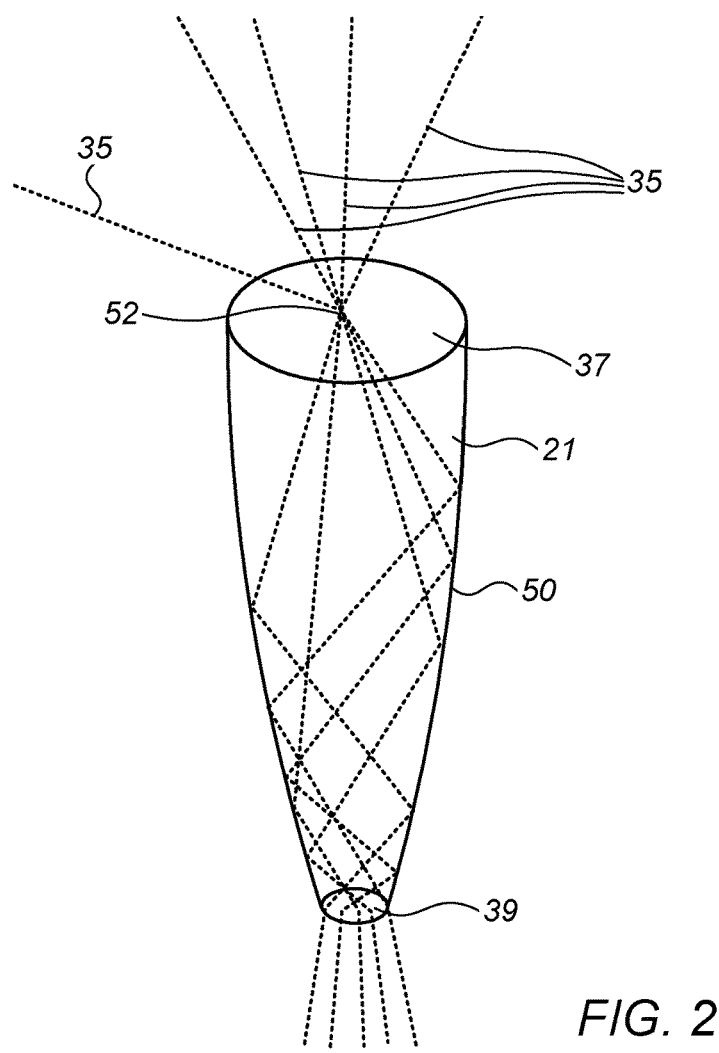
FIG. 2 is a schematic pictorial view of a non-imaging optical element, with optical rays traced through the element, in accordance with an embodiment of the invention.

FIG. 2 is a schematic pictorial view of non-imaging optical element 21, fabricated of solid silicon, with optical rays 35 traced through the element, in accordance with an embodiment of the invention. In this embodiment, non-imaging optical element 21 comprises a compound parabolic concentrator (CPC) and functions as a light-pipe to guide light from front surface 37 to rear surface 39.

A CPC is an optical element comprising a rotationally symmetrical surface around the optical axis, and planar front and rear surfaces perpendicular to the optical axis. The shape of the rotationally symmetrical surface is defined by rotating a section of a parabola (parabolic section) around an axis. This axis is defined as the perpendicular bisector of the line connecting the focal point of the parabola to the point of the parabolic section closest to the focal point. The surface defined by the rotation of this connecting line forms the rear surface of the CPC. The front surface of the CPC is determined by a suitable choice of the end-point of the parabolic section away from the rear surface. The maximal acceptance angle of a hollow CPC, i.e., a CPC that is filled with air, is typically tens of degrees, and is equal to the tilt angle between the axis of the parabola and the axis of rotation. The maximal acceptance angle for a solid CPC, i.e., a CPC fabricated of a solid piece of material, is increased from that of a hollow CPC with the same geometry due to the refraction of the optical rays at the front surface according to Snell's law. Consequently, a solid CPC is able to gather a larger angular extent of light than a hollow CPC. A hollow CPC is manufactured typically of glass or metal, and its inside is coated with a suitable reflective material, such as aluminum. A solid CPC is manufactured of a material that is transmissive at the wavelength of interest, and its rotationally symmetrical surface may be coated externally with a suitable reflective material, such as aluminum.

As shown in FIG. 1, non-imaging optical element 21 is positioned with front surface 37 at or in proximity to focal plane 34, and with rear surface 39 in contact with or in proximity to sensor 38.

In the present embodiment, non-imaging optical element 21 is fabricated of silicon, and is used in scanner 20 at a wavelength of 1550 nm. At this wavelength, silicon is highly transmitting, with an index of refraction of 3.5. Front and rear surfaces 37 and 39, respectively, are coated with a suitable anti-reflection coating in order to reduce reflection losses and to increase the overall transmission of non-imaging optical element 21. A rotationally symmetrical surface 50 of non-imaging optical element 21 does not require a reflective coating due to the high index of refraction of silicon, which ensures total internal reflection of rays 35.

Rays 35 impinge on front surface 37 at a point 52, chosen in this example as the center point of the front surface. Rays 35 propagate within non-imaging optical element 21, internally reflecting from rotationally symmetrical surface 50, and exiting through rear surface 39. At rear surface 39 rays 35 have spread out to a substantially larger area than at point 52 on front surface 37, thus alleviating the problems that are associated with a high local irradiance, were sensor 38 to be placed at focal plane 34. Rays impinging on other points on front surface 37 propagate similarly within non-imaging optical element 21 to rear surface 39.

Thus, independently of the position of focused rays in focal plane 34, all the rays transmitted by non-imaging optical element 21 arrive within the detection area of sensor 38, thus enabling the use of a sensor whose dimensions are independent of target distance and scan speed as long as the streak length L is less than the diameter of front surface 37. As an example, applying the equations presented above, a lag angle γ of 0.75° and a focal length f of 13.6 mm give a streak length L of 356 μm. Thus for any scan speed and target distance yielding a lag angle not exceeding 0.75°, the diameter of front surface 37 does not have to exceed 356 μm.

The condenser efficiency of non-imaging optical element 21, defined as the ratio between the areas of front surface 37 and rear surface 39, is 12.25. Consequently, sensor 38 can be substantially smaller than would be required if the sensor were positioned at focal plane 34.

The numerical aperture of rays accepted by the non-imaging optical element is 0.76. The transmittance of non-imaging optical element 21 is 98%.

Figure 3:
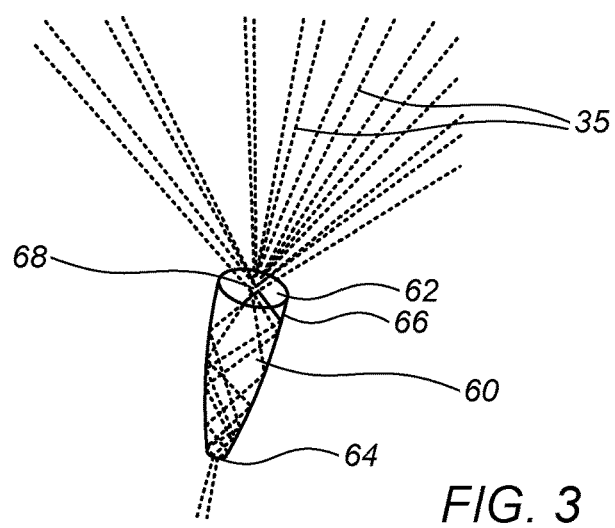
FIG. 3 is a schematic pictorial view of a non-imaging optical element, with optical rays traced through the element, in accordance with another embodiment of the invention.

FIG. 3 is a schematic pictorial view of a non-imaging optical element 60, fabricated of solid glass, with optical rays 35 traced through the element, in accordance with another embodiment of the invention. As in the preceding embodiment, non-imaging optical element 60 comprises a compound parabolic concentrator (CPC) functioning as a light-pipe to guide light from a front surface 62 to a rear surface 64 of the element. With reference to FIG. 1, non-imaging optical element 60 is positioned with front surface 62 at or in proximity to focal plane 34, and with rear surface 64 in contact with or in proximity to sensor 38.

Non-imaging optical element 60 is fabricated of solid glass. Similarly to non-imaging optical element 21 fabricated of silicon, front and rear surfaces 62 and 64 are coated with a suitable anti-reflection coating in order to reduce reflection losses and to increase the overall transmission of non-imaging optical element 60. The transmittance of non-imaging optical element 60 fabricated of glass is 90%. A rotationally symmetrical surface 66 of non-imaging optical element 60 may be coated with a suitable reflective material, such as aluminum.

Rays 35 impinge on front surface 62 at a point 68, again chosen by way of example as the center point of the front surface. Rays 35 propagate within non-imaging optical element 60, internally reflecting from rotationally symmetrical surface 66, and exiting through rear surface 64. At rear surface 64 rays 35 have spread out to a substantially larger area than at point 68 on front surface 62, thus alleviating the problems that are associated with a high local irradiance. Rays impinging on other points on front surface 62 propagate similarly within non-imaging optical element 60 to rear surface 64. Thus, independently of the position of focused rays 35 in focal plane 34, all the rays transmitted by non-imaging optical element 60 arrive within the detection area of sensor 38, enabling the use of a sensor whose dimensions are independent of target distance and scan speed as long as the streak length L is less than the diameter of front surface 62.

The condenser efficiency of non-imaging optical element 60 is 4, the numerical aperture is 0.76, and non-imaging optical element 21 can accept a lag angle γ of 0.4°.

Although non-imaging optical elements 21 and 60 both comprise a CPC, other embodiments of the present invention can use other sorts of non-imaging optical elements comprising a solid piece of a material that are known in the art, such as various sorts of light-pipes.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
    a light source, which is configured to emit a beam of light at a given wavelength;
    at least one scanning mirror configured to scan the beam across a target scene;
    a sensor having a detection area; and
    light collection optics comprising:
        a collection optic positioned so that after the light emitted from the light source is reflected from the scene, and a part of the light that is reflected from the scene is reflected from the at least one scanning mirror, the collection optic collects and focuses the light that was reflected from the at least one scanning mirror onto a focal plane; and
        a non-imaging optical element comprising a solid piece of silicon that is transparent at the given wavelength, having a front surface positioned at the focal plane of the collection optic and a rear surface through which the light that has been focused by the collection optic and guided through the silicon is emitted from the silicon in proximity to the sensor, so that the light is spread over the detection area of the sensor.

2. The optical device according to claim 1, wherein the rear surface of the non-imaging optical element is in contact with the sensor.

3. The optical device according to claim 1, wherein the non-imaging optical element comprises a compound parabolic concentrator (CPC).

4. The optical device according to claim 1, wherein the beam of light comprises a beam of light pulses, and wherein the sensor is configured to output a signal indicative of a time of incidence of a single photon on the sensor.

5. The optical device according to claim 4, and comprising a controller, which is configured to find times of flight of the light pulses to and from points in the scene responsively to the signal.

6. A method of sensing, comprising:
    scanning a beam of light at a given wavelength across a target scene using at least one scanning mirror;

collecting the light that was reflected from the scene and then reflected from the at least one scanning mirror and focusing the collected light onto a focal plane;

positioning a front surface of a non-imaging optical element, comprising a solid piece of silicon that is transparent at the given wavelength, at the focal plane; and sensing the collected light using a sensor positioned in proximity to a rear surface of the non-imaging optical element, which spreads the collected light over a detection area of the sensor.

7. The method according to claim 6, wherein the sensor is positioned in contact with the rear surface of the non-imaging optical element.

8. The method according to claim 6, wherein the non-imaging optical element comprises a compound parabolic concentrator (CPC).

9. The method according to claim 6, wherein the beam of light comprises a beam of light pulses, and sensing the collected light comprises sensing the light pulses and emitting a signal indicative of a time of incidence of a single photon on the sensor.

10. The method according to claim 9, and comprising finding times of flight of the light pulses to and from points in the target scene responsively to the signal.

* * * * *